Aug. 8, 1967 A. S. LAMBURN ETAL 3,334,530
FLUID PRESSURE CIRCUIT
Filed Feb. 12, 1965 5 Sheets-Sheet 1

FIG. 1.

INVENTORS:-
ALAN SALISBURY LAMBURN, RANDLE LESLIE
ABBOTT AND JOHN RAYMOND HILLMAN

INVENTORS:—
ALAN SALISBURY LAMBURN, RANDLE LESLIE
ABBOTT AND JOHN RAYMOND HILLMAN

INVENTORS:-
ALAN SALISBURY LAMBURN, RANDLE LESLIE
ABBOTT AND JOHN RAYMOND HILLMAN

FIG. 9.

United States Patent Office 3,334,530
Patented Aug. 8, 1967

3,334,530
FLUID PRESSURE CIRCUIT
Alan S. Lamburn, Kencott, Via Lechlade, Randle Leslie Abbott, Leamington Spa, and John R. Hillman, Coventry, England, assignors to Axel Wickman Transmissions Limited, Coventry, Warwickshire, England
Filed Feb. 12, 1965, Ser. No. 432,318
Claims priority, application Great Britain, Feb. 14, 1964, 6,216/64
15 Claims. (Cl. 74—781)

The invention relates to a fluid pressure circuit and is particularly, but not exclusively, concerned with a fluid pressure circuit for actuating a ratio-selecting member of a change-speed epicyclic gearing.

With a two-speed epicyclic gearing arranged in the power transmission system of an automobile to provide either unit ratio or the planetary ratio, the ratio-selecting member is normally biased by a mechanical spring means, such as a number of compression coil springs, to provide one of said ratios and is movable by a fluid pressure operable device, such as a piston and cylinder arrangement, to disengage the said one ratio against the bias of the compression coil springs and to engage the other of said ratios. Thus, the engagement of the said other ratio is effected by supplying fluid pressure to the piston and cylinder arrangement, and the engagement of the said one ratio is effected by exhausting fluid pressure from the piston and cylinder arrangement so that the compression coil springs act on the member. It will therefore be appreciated that the gear-changing characteristics, for instance the smoothness of gear-changing, is determined by the manner in which the fluid pressure is either supplied to, or exhausted from, the piston and cylinder arrangement. It is an object of this invention to provide a fluid pressure circuit which will actuate a ratio-selecting member of a change-speed epicyclic gearing in an improved manner.

According to one aspect of the invention a fluid pressure circuit, for actuating two fluid pressure operable devices, has a pressure relief valve adapted to control a source of fluid for one of the fluid pressure operable devices so that its pressure will not fall below a predetermined minimum value, an axially-movable piston has a greater effective area than that of the movable member of the pressure relief valve, a resiliently distortable means operatively interconnects the piston and the movable member of the pressure relief valve whereby, when the source of fluid acts on the piston, the force generated by the fluid pressure on the piston will be transmitted through the resiliently distortable means to the movable member of the pressure relief valve thus increasing the pressure of the source of fluid above the said predetermined minimum value, a control means is arranged to inhibit the transmission of additional force from the piston to the movable member of the relief valve when the pressure of the source of fluid has reached a predetermined maximum value, and valve means operable by the piston, when the pressure of the source of fluid exceeds a predetermined value intermediate the said maximum and minimum values, to connect the source of fluid to the other of the fluid pressure operable devices.

According to a further feature the control means may be a resiliently distortable buffer arranged to act progressively on the piston in opposition to the force generated on the piston by the fluid pressure, and the forces exerted on the piston by the fluid pressure and by the resiliently distortable means and by the resiliently distortable buffer are in equilibrium when the pressure of the source of fluid is at the said predetermined maximum value.

According to another feature the piston may be sealingly supported for axial sliding in a coacting bore provided with a valve port which is covered by the piston when the pressure of the source of fluid is at the said predetermined minimum value but is uncovered by the piston when the pressure of the source of fluid exceeds the said predetermined intermediate value, and the piston and the valve port constitute the said piston operable valve means.

According to another feature the said other fluid pressure operable device may be a dashpot that will store a volume of fluid under pressure when the pressure of the source of fluid exceeds the said predetermined intermediate value so that the piston operable valve means is operated, a control valve is operable between a first position in which the source of fluid is connected to act on the piston and a second position in which the source of fluid is isolated from the piston and the fluid acting on the piston is connected to exhaust through a flow restrictor, and the dashpot is connected through a non-return valve to a point in the fluid circuit intermediate the piston and the flow restrictor whereby, when the control valve is operated to its said second position and the pressure of the fluid acting on the piston has dropped to a value below the pressure of the volume of fluid stored by the dashpot, the fluid stored by the dashpot will pass through the non-return valve to increase the volume of fluid that must pass through the flow restrictor thereby decreasing the rate at which the pressure acting on the piston will decay and consequently decreasing the rate at which the pressure of the source of fluid and the pressure acting on the said one fluid pressure operable device will decay to the said predetermined minimum value.

According to yet another feature the fluid pressure circuit may be for controlling a ratio-selecting member which is biased by a mechanical spring means to engage a first friction surface to provide one ratio of a change-speed gearing and is movable against the action of the mechanical spring means to engage a second friction surface to provide another ratio of the change-speed gearing, and the said one fluid pressure operable device is adapted to move the ratio-selecting member against the mechanical spring means to engage the second friction surface when said control valve is operated to its said first position, and the force generated by the said one fluid pressure operable device when the volume of fluid stored by the dashpot starts to pass through the flow restrictor prevents the full engagement of the ratio-selecting member with the first friction surface by the mechanical spring means whereby the full engagement of the said one ratio will be delayed until the pressure acting on the said one fluid pressure operable device has decayed to the said predetermined minimum value. Preferably the said one fluid pressure operable device is operatively connected to the ratio-selecting member through a resiliently distortable member for cushioning the engagement of the ratio-selecting member with the second friction surface.

According to a further feature the force generated by the said one fluid pressure operable device when the pressure of the source of fluid is at the said predetermined intermediate value may be arranged to be sufficient for disengaging the ratio-selecting member from said first friction surface against the action of the mechanical spring means and for engaging said ratio-selecting member at least partially with said second friction surface. Preferably the said one fluid pressure operable device may be arranged to cause the complete engagement of the said ratio-selecting member with the said second friction surface at a fluid pressure below the said predetermined intermediate value whereby the flow of fluid into the dashpot will not interfere with the engagement of the said another ratio of the change-speed gearing.

According to another feature the dashpot may be formed by a piston and cylinder assembly, the dashpot piston is movable against a compression coil spring by the pressure of the fluid in the dashpot cylinder, and means are provided for inhibiting further movement of the dashpot piston against its spring after the fluid pressure in the dashpot cylinder has reached a predetermined value.

According to another aspect of the invention a fluid pressure circuit, for actuating two fluid pressure operable devices, may have a pressure relief valve adapted to control a source of fluid for one of the fluid pressure operable devices, a control valve adapted optionally to connect the fluid pressure to act on a piston having a greater effective area than that of the movable member of the pressure relief valve, a resiliently distortable means operatively interconnecting the piston and the movable member of the pressure relief valve whereby the force generated on the piston by the fluid pressure will increase the relief pressure of the pressure relief valve and thus increase the fluid pressure, a resiliently distortable buffer adapted to act progressively on the piston as the latter is moved by the fluid pressure acting on it whereby progressively to check the effect of the piston on the pressure relief valve and to provide a stable maximum relief pressure, a valve adapted to be operated by the piston before the maximum relief pressure is reached for connecting the source of fluid pressure to the other of the fluid pressure operable devices, the control valve adapted optionally to disconnect the piston from the source of fluid and to connect the fluid acting on the piston to exhaust so that the pressure relief valve will return to its original setting together with the pressure acting on the said one fluid pressure operable device, and means adapted to relieve the pressure acting on the said other fluid pressure operable device when the piston is disconnected from the source of fluid.

According to another more specific aspect of the invention a fluid pressure circuit, for actuating a ratio-selecting member of a change-speed epicyclic gearing, may have a fluid pressure operable device adapted to move the ratio-selecting member against a bias to engage one ratio of the gearing, a source of fluid connected to act on said device and having its pressure controlled by a pressure relief valve to be sufficiently low for the said bias to cause the ratio-selecting member completely to engage the other ratio of the gearing, a control valve adapted optionally to connect the fluid pressure to act on a piston having a greater effective area than that of the movable member of the pressure relief valve, a resiliently distortable means interconnecting the piston and the movable member of the pressure relief valve whereby the force generated on the piston by the fluid pressure will increase the relief pressure of the pressure relief valve and thus increase the fluid pressure and cause the device to move the ratio-selecting member against the bias to engage the said one ratio, a resiliently distortable buffer adapted to act progressively on the piston as the latter is moved by the fluid pressure acting on it whereby progressively to check the effect of the piston on the pressure relief valve and to provide a stable maximum relief pressure so that the maximum force exerted by the device on the ratio-selecting member for engaging the said one ratio is limited, a valve adapted to be operated by the piston before the maximum relief pressure is reached for connecting the source of fluid to charge a dashpot with a volume of fluid under pressure, the control valve adapted optionally to disconnect the piston from the source of fluid and to connect the fluid acting on the piston to exhaust through a flow restrictor so that the pressure acting on the piston will decay quickly at least until the valve connecting the source of fluid to the dashpot is closed so that the pressure acting on the device will decay rapidly to a value at which the bias will cause the ratio-selecting member partially to engage the said other ratio, a non-return valve operatively connecting the dashpot to a point in the fluid circuit intermediate the piston and the flow restrictor so that when the pressure acting on the piston falls below the pressure of the dashpot fluid the latter will flow through the non-return valve and will decrease the rate at which the pressure acting on the piston will decay through the flow restrictor, whereby the pressure acting on the device will decay slowly from the value at which the non-return valve opened to the value determined by the original setting of the pressure relief valve so that, as the pressure acting on the device slowly decays, the bias will progressively assert itself and will smoothly cause the complete engagement of the ratio-selecting member with the said other ratio.

In the case where the fluid is a lubricant, the pressure relief valve may, according to a still further feature, have its exhaust arranged to discharge fluid into a forced lubrication circuit. In such a case, the maximum pressure of the fluid in the forced lubrication circuit is preferably controlled by a second pressure relief valve to be lower than the minimum relief setting of the first pressure relief valve.

The invention is now described, by way of example only, with reference to the accompanying drawings, in which.

FIGURES 1 to 8 illustrate a fluid circuit for controlling an overdrive epicyclic gearing for an automobile. Overdrive epicyclic gearings are generally well-known and are usually arranged such that the planetary ratio is provided by braking a reaction member of the gearing to a non-rotary casing so that the output shaft of the gearing is driven faster than the input shaft and in the same direction, and the planetary action can be inhibited by clutching the reaction member to either the input shaft or the output shaft so that the output shaft is driven at the same speed as the input shaft and in the same direction. It is also well-known for a unidirectional clutch to be used to prevent the power input shaft from rotating faster than the power output shaft such that, when the planetary overdrive ratio is engaged and the power input shaft is transmitting torque to the power output shaft, the release of the brake holding the reaction member allows the power input shaft to accelerate to synchronisation with the power output shaft whereupon the unidirectional clutch locks and gives a smooth gear change into the unit ratio. Thus it will be appreciated that the clutch holding the reaction member to either the input shaft or output shaft will not transmit any torque whilst the power input shaft drives the power output shaft as all the torque is transmitted by the unidirectional clutch. However, under reverse torque conditions, the unidirectional clutch would tend to freewheel and the clutch will have to transmit the full torque. Thus, whilst the vehicle is being slowed down by using the engine as a brake (hereinafter called an "overrun condition"), the release of the brake holding the reaction member will allow the speed of the engine and thus the speed of the power input shaft to drop so that the unidirectional clutch will freewheel until the clutch engages. Unless the engagement of the clutch under these conditions is very carefully controlled an undesirable shock will be generated in the vehicle transmission.

Figure 1:
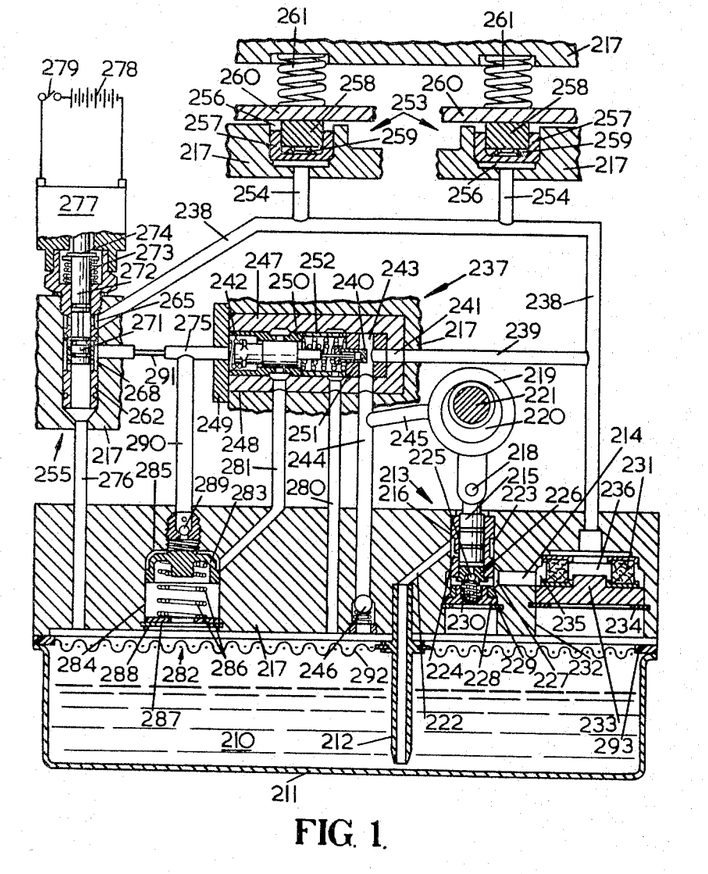
FIGURE 1 shows one form of fluid pressure circuit for actuating a ratio-selecting member of a change-speed epicyclic gearing.

Referring to FIGURE 1, lubricating fluid 210 is drawn from a sump 211 through an inlet pipe 212 by a pump 213 which delivers fluid to an outlet 214. The pump 213 has a piston 215 which is reciprocable in a sleeve 216 supported by a casing 217 and is driven through a pivot pin 218 by a collar 219 which coacts with an eccentric 220 that is formed on the power input shaft 221 of the epicyclic gearing. The piston 215 draws lubricating fluid from pipe 212, through a passage 222 formed in casing 217, to an annular chamber 223 which is formed between sleeve 216 and casing 217 and communicates with the bore of sleeve 216 through a series of radial ports 224. The lubricating fluid is delivered to outlet 214 through a spring-loaded non-return valve 225 formed in cylinder head 226 and annular chamber 227 formed in casing 217. The spring of the non-return valve 225 reacts against a plug 228 which is held in place by a spring clip 229, and the cylinder head 226 is allowed a slight degree of axial movement against a compression coil spring 230 arranged coaxially around the spring of the non-return valve whereby to diminish any shocks that might be generated by the piston 215 operating on the lubricating fluid.

A ring-shaped filter element 231 is held sealingly in a bore 232 of casing 217 by a plug 233 and a spring clip 234 so that lubricating fluid from outlet 214 will enter the annular space 235 defined between filter element 231 and bore 232, and will then pass radially inwards through the filter element to a chamber 236 so that the filter element 231 will remove any foreign bodies that may be entrained in the lubricating fluid.

The pressure in chamber 236 is controlled by a pressure relief valve 237 which is connected to chamber 236 by ducts 238 and 239 and has a piston 240 which is urged towards a port 241 by a pre-loaded compression coil spring 242 as will be appreciated more fully later on. In this manner the pressure in chamber 236 is determined by the effective area of piston 240 and by the force exerted by spring 242. The lubricating fluid, that flows from duct 239 past piston 240, is conveyed by a diametral bore 243 to ducts 244 and 245 which constitute a forced lubrication circuit for shaft 221, the maximum pressure of the fluid in thhe ducts 244 and 245 being controlled by a pressure relief valve 246 to be lower than the pressure in duct 239. In general the pressure relief valve 237 comprises a sleeve 247 which is retained in a bore 248 of casing 217 by an end plate 249 and is provided with a pair of coaxial cylinder liners 250 and 251 separated by a tubular spacer 252. However the detailed construction and operation of pressure relief valve 237 will be described later with particular reference to FIGURES 5 to 8.

Duct 238 is connected to a pair of fluid pressure operable piston and cylinder devices 253 by ducts 254, and to a control valve 255.

Each fluid pressure operable piston and cylinder device 253 comprises a bore 256 formed in casing 217 and a piston 257 having a telescopic nose portion 258 which is biased towards its extended position by a frusto-conical spring washer 259. When a sufficient fluid pressure is applied to the pistons 257, the latter move a ratio-selecting member 260 of the overdrive epicyclic gearing against compression coil springs 261 which react on casing 217 so as to engage the planetary overdrive ratio of the epicyclic gearing. Subsequently, when the fluid pressure acting on the pistons 257 is relaxed, the springs 261 move the member 260 to the position shown in FIGURE 1 so as to engage the unit, or direct drive, ratio of the epicyclic gearing.

Figures 2, 3:
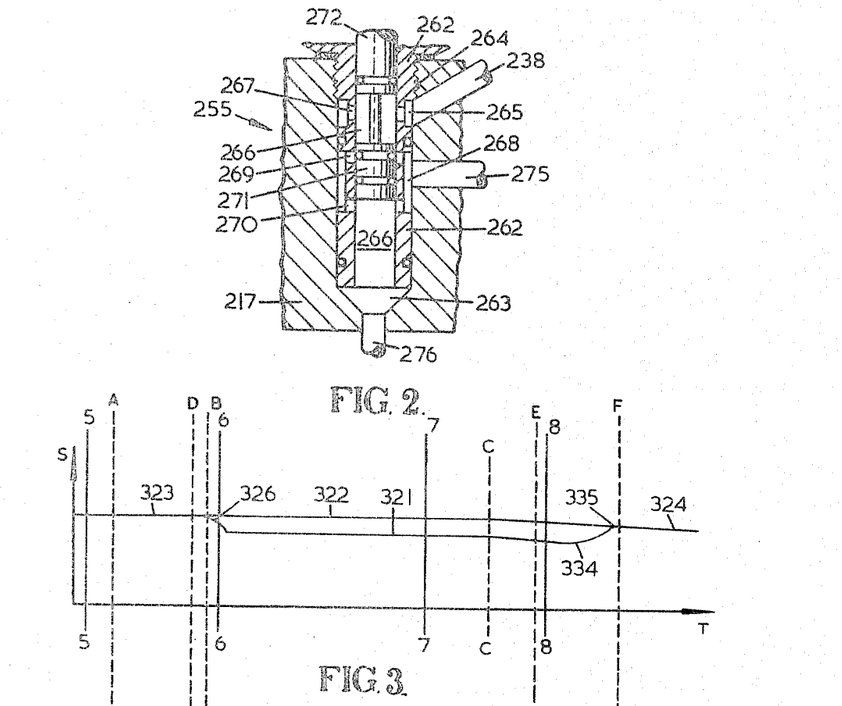
FIGURE 2 is an enlarged view of the control valve shown in FIGURE 1.
FIGURES 3 and 4 are graphs illustrating the operation of the fluid pressure circuit of FIGURE 1.

Control valve 255 is seen best in FIGURE 2 and comprises a sleeve 262 arranged in a bore 263 of casing 217 and held in place by screw threads 264. Sleeve 262 defines an annular gallery 265 which communicates with a bore 266 through radial ports 267, and also defines an annular gallery 268 which communicates with the bore 266 through two axially-spaced sets of radial ports 269 and 270. A valve spool 271 is carried by a spindle 272 and, as will be seen in FIGURE 1, a compression coil spring 273 acts between sleeve 262 and a flange 274 of spindle 272 so as to bias spool 271 into the position shown in FIGURES 1 and 2. In this manner gallery 265 is isolated by the spool 271, and gallery 268 communicates through ports 270 with the bottom portion of bore 266 so that a duct 275 leading from the pressure relief valve 237 to gallery 268 communicates with a duct 276 which leads from the bottom portion of bore 266, through casing 217 to the sump 211. As will be seen in FIGURE 1, the spindle 272 constitutes the armature of a solenoid 277 which is in series with a battery 278 and with an electrical switch 279. When the latter is closed the solenoid 277 is actuated to move spindle 272 against spring 273 to bias spool 271 downwards in the drawings. In this manner the spool 271 covers ports 270 thus isolating gallery 268 from duct 276, and uncovers ports 269 so that galleries 265 and 268 are put into communication whereby lubricating fluid will flow from duct 238 to duct 275. It will be noted that the valve spool 271 is pressure balanced at all times so that the solenoid 277 only requires a low operating current, and that the spool 271 can only uncover one set of ports 269 or 270 at any instant whereby leakage from duct 238 to duct 276 is inhibited.

The pressure relief valve 237 is provided with a pair of ducts 280 and 281 of which the function will be properly understood later after FIGURES 4 to 8 have been described. Duct 280 leads straight through casing 217 to the sump 211 and duct 281 communicates with a dashpot 282. The latter comprises a piston 283 which coacts with a cylinder 284 formed as a bore in casing 217, and is biased towards the cylinder head 285 by a pair of compression coil springs 286 that react against a perforated washer 287 held in cylinder 284 by a spring clip 288. Cylinder 284 is connected through a non-return valve 289 and a duct 290 to the duct 275, and a flow restrictor 291 is arranged between the junction of duct 290 with duct 275 and gallery 268 for a purpose that will be appreciated later. As the lubricating fluid is used for lubricating the epicyclic gears through appropriate passages formed in shaft 221, a gauze 292 is arranged between the casing 217 and sump 211 to prevent any metal chips that might be formed from being drawn into inlet pipe 212. Preferably the gauze 292 is formed integral with a gasket 293 for the junction of the sump 211 with casing 217.

As FIGURES 5 to 8 are diagrams illustrating the operation of the fluid pressure circuit shown in FIGURE 1, the same reference numerals have been used to identify corresponding components. In general, FIGURES 5 to 8 have been simplified by the omission of a major portion of casing 217, and by showing the pump 213, the filter 231, the pressure relief valve 246, the lubrication circuit 221 and 245, and the control valve 255 diagrammatically. Additionally the pressure relief valve 237 has been drawn to a larger scale so that its construction and operation will be more readily understood.

Figure 5:
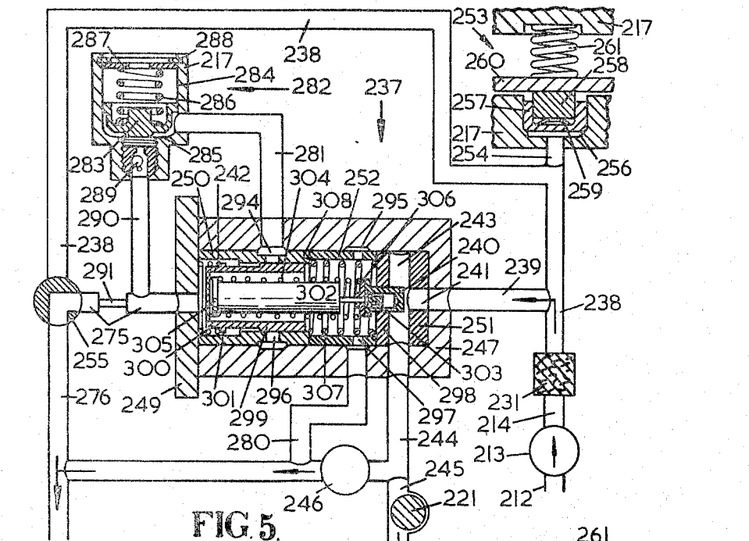
FIGURES 5, 6, 7 and 8 are diagrams illustrating the operation of the circuit shown in FIGURE 1 at the times indicated by the respective dotted lines 5—5, 6—6, 7—7 and 8—8 of FIGURES 3 and 4.

From FIGURE 5 it will be appreciated that the pressure relief valve 237 has two annular chambers 294 and 295 formed in the bore of sleeve 247 to register with series of ports 296 and 297 formed respectively in liner 250 and tubular spacer 252. Port 241 and diametral bore 243 are formed in liner 251 which also provides a guide 298 for piston 240. Liner 250 acts as a guide for a piston 299 which is provided at one end with a reduced diameter portion 300 having an annular flange 301 for abutting the spring 242. A pin 302 has a nose 303 which is telescopically supported in a bore formed in piston 249, and a pre-loaded compression coil spring 304 is arranged coaxially around pin 302 and is trapped between an enlarged head 305, which bears against piston 299, and a collet 306 that abuts nose 303. The loading of spring 242 is arranged so that, when duct 275 is connected to exhaust duct 276, the force acting on piston 240 is small whereby the pressure of the lubricating fluid in ducts 238 and 239 is a minimum value, and the loading of spring 304 is arranged to be greater than that of spring 242 so that the pin 302 and the collet 306 act as a solid member for transmitting the force of spring 242 to piston 240. However, it will be appreciated that the application of fluid pressure through duct 275 will produce a resultant force on the piston 299 and that the latter will tend to move to the right in FIGURE 5, the relative motion between pistons 240 and 299 being accommodated by telescopic movement of nose 303 relatively to the piston 240 so that the force transmitted by spring 304 is applied to piston 240 and thus increases the pressure of the lubricating fluid in ducts 238 and 239. The movement of piston 299 to the right is progressively opposed by a buffer spring 307 which is pre-loaded and is held captive between liner 251 and the end face 308 of liner 250 so that the end face of piston 299 will coact with the buffer spring 307 when it reaches the junction between liner 250 and tubular spacer 252.

FIGURE 5 depicts the same condition as that shown in FIGURE 1 with control valve 255 blocking duct 238 and connecting duct 275 to exhaust duct 276. In this condition piston 240 of pressure relief valve 237 controls the pressure of the lubricating fluid in ducts 238 and 239 to be at the minimum value, and this pressure is communicated through duct 254 to act on piston 257, but the pressure is insufficient to affect appreciably the engagement of the said unit ratio of the epicyclic gearing by the springs 261. In view of this piston 257 will not move and, as duct 238 is blocked by control valve 255, the entire output of pump 213 must pass through pressure relief valve 237 and thence either to the forced lubrication circuit 245 or to exhaust through pressure relief valve 246. The prevailing pressure acting on piston 257, that is the minimum relief pressure of pressure relief valve 246, is indicated at 309 in FIGURE 4 which is a graph of pressure P against time T. FIGURE 3 is a graph of rotational speed S against time T.

Figure 6:
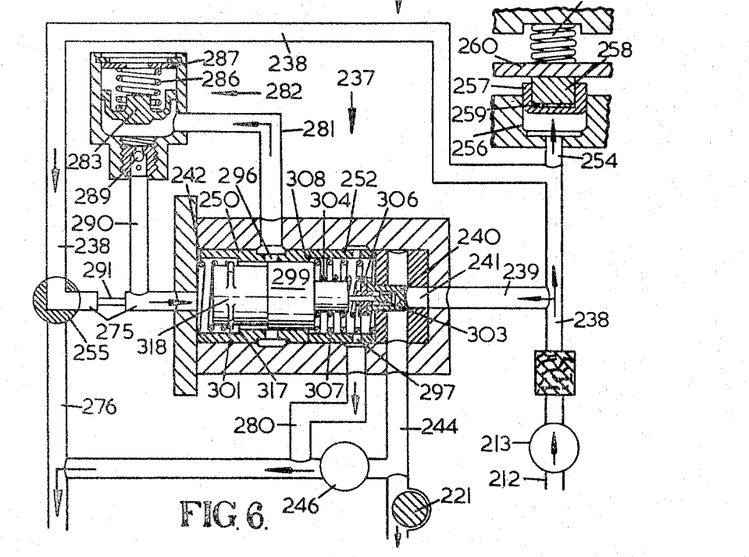
Figure 7:
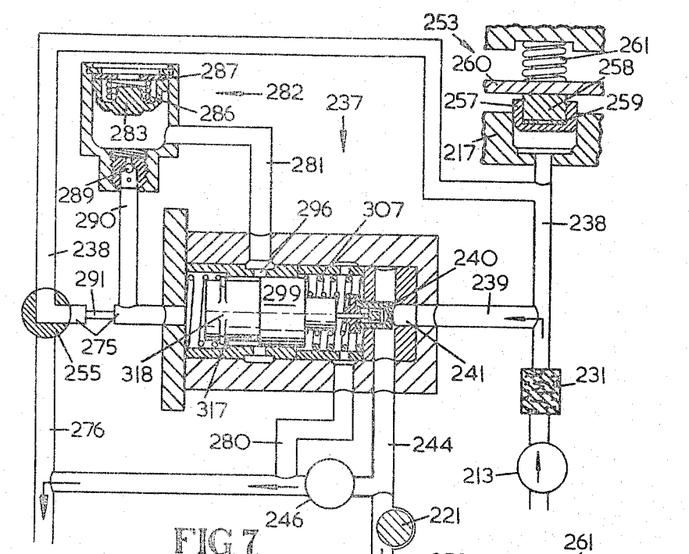
Figure 8:
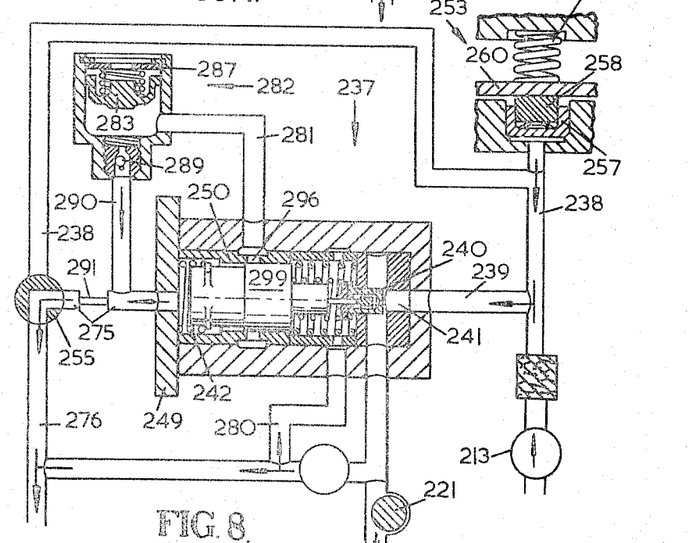

As all the components of the diagrammatic circuits shown in FIGURES 5 to 8 have been identified in FIGURE 5, only the major reference numerals have been shown in FIGURES 6 to 8 for the sake of clarity.

For the pressure condition 309 to be changed, the control valve 255 is actuated to the position shown in FIGURE 6 so that the pressure of the lubricating fluid in duct 238, that is the minimum relief pressure 309 given by piston 240 of relief valve 237, acts on piston 299 through duct 275 and flow restrictor 291. As the effective area of piston 299 is greater than that of piston 240, the force urging piston 240 towards port 241 is immediately increased and accordingly increases the pressure of the lubricating fluid in ducts 238, 239 and 254 with the result that the pressure acting on piston 257 and on piston 299 increases. This chain reaction of pressure rises commences at the time indicated by the dotted line A—A in FIGURES 3 and 4 and continues with the pressure acting on piston 257 rising along line 310 in FIGURE 4 to a point 311 where the line 310 rapidly changes its slope and becomes a line 312 which is parallel with the time axis T thus denoting a constant pressure acting on piston 257. As the pressure in duct 238 rises towards point 311 the piston 299 moves towards piston 240 in order to increase the loading of spring 304, the movement of piston 299 towards piston 240 being allowed by the nose 303 moving away from the collet 306, and the change of volume of the interior of spacer 252 being assisted by transfer through ports 297 to duct 280 which is connected by duct 276 to the sump 211. The movement of piston 299 towards piston 240 is progressively opposed by the buffer spring 307 when the end of piston 299 passes the end face 308 of liner 250 so that the out of balance force on piston 299, due to the difference between its effective area and that of piston 240, diminishes as the pressure acting on piston 299 increases. At the time indicated by the dotted line B—B in FIGURE 4, the pressure of the fluid has moved piston 299 sufficiently towards piston 240 for its end face partially to uncover ports 296 and allow lubricating fluid to flow from duct 275, through ports 296 and duct 281 to the dashpot 282. Thus at the time indicated by the dotted line B—B, lubricating fluid starts to flow into the dashpot 282 and the pressure acting in the dashpot increases progressively along line 313 as the dashpot springs 286 are compressed. Whilst the dashpot is being filled the passage of lubricating fluid through ports 296 is accompanied by a substantial pressure drop between ducts 275 and 281 so that non-return valve 289 is held closed by the preponderance of pressure in duct 275, and the pressure of the lubricating fluid in the dashpot 282 is determined by the compression of the dashpot springs 286. FIGURE 6 consequently shows the dashpot 282 partially filled and indicates the condition of piston 257 under the action of fluid pressure 312 as will be described more fully later.

The pressure in the dashpot rises steadily along line 313 to a point 314 where the piston 283 abuts washer 287 and the dashpot is full. At point 314 the flow through duct 281 will cease, assuming that the lubricating fluid is incompressible, and the pressure in the dashpot will rise steeply along line 315 whilst the piston 299 starts to move again thus fully opening ports 296 and eliminating the pressure drop across them so that the pressure acting on piston 257 will rise again, as indicated by line 316, until the annular flange 301 engages a ledge 317 formed on the inner periphery of liner 250. Flats 318 are cut in the flange 301 to enable the lubricating fluid to pass the flange whilst it is abutting ledge 317. Thus at a point 319 in FIGURE 4, the flange 301 engages ledge 317 to prevent the force exerted on piston 240 from being increased further, so that the pressure of the lubricating fluid in the dashpot 282 and the pressure acting on the piston 257 will be at a constant maximum value as indicated by the line 320 in FIGURE 4. FIGURE 7 consequently shows the dashpot 282 filled and indicates the condition of piston 257 under the action of fluid pressure 320.

Figure 4:
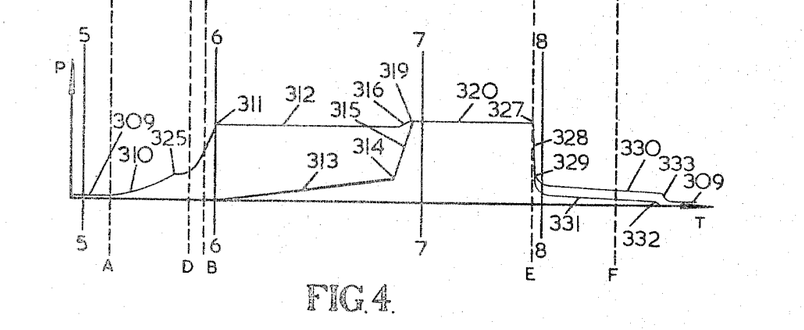

To this point the change of pressure conditions from the stable condition shown in FIGURE 5 and indicated by the line 5—5 in FIGURE 4, to the stable condition shown in FIGURE 7 and indicated by the line 7—7 in FIGURE 4 has been fully described. This change of pressure conditions causes the engagement of the planetary overdrive ratio as will now be described with reference to the speed-time graph shown in FIGURE 3 of which the time axis T is synchronised with the time axis T of FIGURE 4 as indicated by the dotted line A—A. In FIGURE 3 the speed of the power input shaft is indicated at 321, the speed of the power output shaft at 322, and the lines 323 and 324 indicate conditions under which the power output shaft and the power input shaft are rotating at the same speed. The line 323 is parallel to the time axis and, as the speed of the power output shaft is directly proportional to the road speed of the vehicle, it will therefore be appreciated that the line 323 also indicates that the road speed of the vehicle is constant. Line 322 is a colineal extension of line 323 up to the time indicated by dotted line C—C and accordingly also represents a constant vehicle speed. However, the line 322 slopes towards the time axis from the time indicated by the dotted line C—C thus indicating that the vehicle speed is dropping and this will be discussed in detail later on.

As previously mentioned the minimum relief pressure 309, that is the pressure given when the control valve 255 is in the position illustrated in FIGURE 5, is so small as to have no undesirable effect on the engagement of the unit ratio of the overdrive epicyclic gearing by the bias of spring 261, and the unit ratio is fully engaged at the line 5—5 in FIGURE 3. However, the control valve 255 is moved to the position shown in FIGURE 6 at the time indicated by the dotted line A—A in FIGURES 3 and 4 so that the pressure acting on piston 257 increases rapidly along line 310. When the pressure has reached the value indicated by point 325 in FIGURE 4 the force exerted by the piston 257 is exactly equal to the loading of springs 261 so that the clutch previously holding the reaction member to either the input shaft or the output shaft is released. However, as has been previously described, the torque is transmitted through the unidirectional clutch when unit ratio is engaged and the power input shaft is driving the power output shaft, and therefore the disengagement of the clutch that was holding the reaction member does not affect the ratio of the gearing. But the pressure acting on piston 257 continues to rise along line 310 from point 325 towards point 311 and moves the ratio-selecting member 260 to present the aforesaid brake for the reaction member to the non-rotary casing at the time indicated by the dotted line D—D in FIGURES 3 and 4. The initial engagement of this brake with the non-rotary casing is accompanied by 100% slipping until the braking torque is increased by the rising pressure to a value sufficient for causing the aforesaid unidirectional clutch to freewheel thereby causing the speed of the power input shaft to drop along line 326 in FIGURE 3 below the speed 322 of the power output shaft. The junction of lines 323 and 326 therefore indicates the time when the unidirectional clutch is caused to freewheel. By the time that the pressure acting on piston 257 has reached the point 311 in FIGURE 4, the force acting on the piston is sufficient for loading the brake to a capacity sufficient for holding the reaction member stationary under maximum torque reaction. When the reaction member is stationary the speed of the input shaft is a fixed fraction of the output shaft speed as indicated by lines 321 and 322. The junction of lines 326 and 321 therefore indicates the time when the planetary overdrive ratio is fully engaged, however, it will be noted that the overdrive ratio is not fully engaged at the exact instant that the pressure attains the value indicated by point 311 as the engagement of the brake with the non-rotary surface has to decelerate the reaction member from the speed indicated by line 323 to rest. It will be observed that the filling of the dashpot 282 commences after the initial engagement of the overdrive ratio, however the filling of the dashpot requires a proportion of the output of pump 213 and accordingly tends to slow up the rise in pressure in the system as a whole to a slight extent. This tendency may be exploited, if desired, to slow up any part of the gear change from unit ratio to the overdrive ratio by varying the pressure at which the ports 296 are to open. However, we prefer that the opening of ports 296 should be delayed as long as is practicable so that the engagement of the brake for the overdrive ratio is not delayed more than can conveniently be avoided. Due to the progressive increase of pressure from point 325 to point 311, in FIGURE 4, the engagement of the overdrive ratio is achieved without the generation of any undesirable shocks, the movement of piston 258 being cushioned by the spring washer 259 which is compressed to a flat shape as indicated in FIGURE 6 during the engagement of the overdrive ratio.

The epicyclic gearing may be left with the overdrive ratio engaged for any desired length of time. However, it has been assumed that at the time indicated by dotted line E—E, the control valve 255 has been actuated to the position indicated in FIGURE 8 so that the unit ratio will be engaged.

If the pressure acting on piston 257 were allowed to decay rapidly to zero, the ratio-selecting member 260 would almost instantaneously engage the unit ratio of the epicyclic gearing under the full force of springs 261 and this would cause the generation of a severe shock. However, the generation of this shock is prevented by the circuit in the manner that will now be described.

When, at the instant defined by the dotted line E—E, the control valve 255 is actuated to the position indicated in FIGURE 8, duct 238 is isolated from duct 275 and the lubricating fluid action on piston 299 escapes to the sump 211 through the flow restrictor 291 and ducts 275 and 276. Due to the small volume of fluid contained between the lines 250, the piston 299 and the end plate 249, the pressure acting on the piston 299 will decay rapidly through the flow restrictor 291 thus closing ports 296 and reducing the bias urging piston 240 towards port 241 so that the pressure acting on the piston 257 will decay rapidly past the piston 240 from the value indicated by point 327 along the line 328. However, as the pressure in duct 275 falls, it quickly reaches a value slightly below the pressure of the fluid stored in the dashpot 282 so that the non-return valve 289 opens as shown in FIGURE 8 whereby the dashpot fluid supplements the extremely small flow of fluid passing through the flow restrictor 291. Due to this increase in the volume of fluid under the same pressure passing through the flow restrictor, the rate of decay of the pressure acting on piston 299 is less than before and the pressure of the fluid acting on the piston 257 falls slowly from the point 329 where the non-return valve 289 opened along the line 330, whilst the dashpot pressure falls from the point 329 along the line 331 until the dashpot is empty at point 332. When the dashpot is empty the pressure acting on piston 299 is zero so that the loading of relief valve piston 240 is derived solely from springs 242 and the pressure acting on the piston 257 has returned to the minimum relief pressure 309. As the dashpot piston 283 engages the washer 287 at the pressure indicated by point 314, the pressure rise from point 314 to point 319 does not introduce any further fluid into the dashpot and accordingly the dashpot pressure will drop from point 327 to point 329 along the line 328 when the control valve 255 is operated to the position in FIGURE 8 which illustrates the action of the dashpot in retarding the decay of the pressure acting on piston 299. The point 329 where the non-return valve 289 opens is of course substantially the same pressure as point 314.

Insofar as the operation of the ratio-selecting member 260 is concerned, the disengagement of the brake holding the reaction member to the casing is sufficient to cause the engagement of the unit ratio provided that the power input shaft of the gearing is driving the power output shaft, as the power input shaft will increase its speed as aforesaid until the unidirectional clutch locks and the clutch for the reaction member may be engaged either after the unidirectional clutch has locked, or before the unidirectional clutch has locked whereby to hasten the engagement of the unit ratio. Thus, when the power input shaft of the gearing is driving the power output shaft, the operation of the clutch for the reaction member is not critical. However during an overrun condition its operation is very critical if an undesirable shock is not to be generated in the transmission and, so that the manner in which this shock is avoided may be understood, FIGURE 3 illustrates a gear change from the overdrive ratio to unit ratio during an overrun condition which starts at the time indicated by the dotted line C—C.

When the control valve 255 is operated at the time indicated by the dotted line E—E in FIGURES 3 and 4 to the position shown in FIGURE 8, the pressure of the lubricating fluid acting on the piston 257 will decay rapidly to the value indicated by point 329 in FIGURE 4 so that the springs 261 move the ratio-selecting member 260 to cause the complete disengagement of the brake holding the reaction member of the gearing stationary, and to cause the clutch for the reaction member partially to engage whereby to prevent the speed of the power input shaft from dropping below the value indicated by the right-hand end of line 321. The force of engagement of the clutch for the reaction member will then steadily increase to its maximum value at the point 333 as the pressure acting on the piston 257 decays along line 330. It will accordingly be appreciated that the full force of engagement of the clutch for the reaction member will not be developed until a time equivalent to the horizontal spacing of points 329 and 333 has elapsed, and that during this delay the clutch for the reaction member will progressively assert itself and raise the speed of the power input shaft along line 334 until it is clutched directly to the power output shaft at point 335 in FIGURE 3 which occurs at the time indicated by the dotted line F—F. As this dotted line cuts the line 330 in FIGURE 4 before the pressure has fallen along line 330 to point 333, it can be deduced that the full engagement of the clutch for the reaction member is delayed for a time equivalent to the horizontal spacing between the dotted lines E—E and F—F and that this delay coupled with the progressive assertion of the clutch for the reaction member will provide a smooth engagement of unit ratio despite the overrun condition.

If desired the duration of the delay between points 329 and 333 may be adjusted according to particular requirements by matching the capacity of the dashpot 282 with the characteristics of the flow restrictor 291. The minimum relief pressure 309 may be adjusted by varying the loading of spring 242, and the maximum pressure that acts in cylinder 257 may be adjusted by altering the load of spring 304 when the flange 301 of piston 299 abuts ledge 317. The magnitude of the pause pressure 312 acting in cylinder 257 can be altered by arranging for piston 299 to uncover ports 296 at the required new pressure, and its duration may be adjusted by varying the capacity of the dashpot 282 or the output of the pump 213. Also the pressure at which point 329 occurs can be altered by varying the loading of dashpot spring 286.

Although the flow restrictor 291 has been shown as a restricted passage between the two portions of duct 275, it could take other forms and, if desired, could be arranged to act as a restrictor only when fluid flows from the piston 299 and the dashpot 282 to exhaust.

Although FIGURES 1 to 8 have been described with specific reference to an overdrive epicyclic gearing, the teaching of this invention could readily be applied to an underdrive epicyclic gearing or to selecting two ratios of a multi-ratio change-speed gearing.

Figure 9:
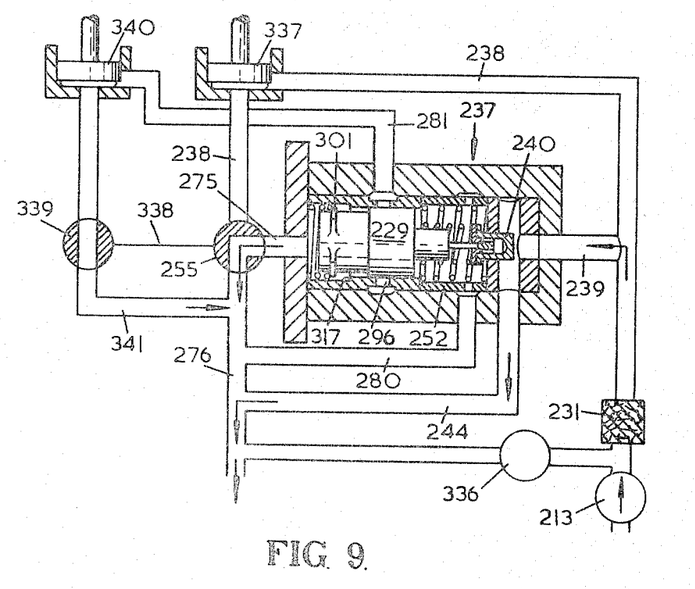
FIGURE 9 is a diagram illustrating another application of a fluid circuit in accordance with the invention.

FIGURE 9 illustrates the broad application of a fluid pressure circuit in accordance with the invention and, as a large number of its components have already been illustrated and described with reference to FIGURES 1 to 8, the same reference numerals have been used to identify equivalent components. In FIGURE 9 a pump 213 delivers fluid through filter 231 to duct 238, a pressure relief valve 336 being provided to prevent pump 213 from being overloaded in the event that the filter becomes clogged. The pressure of the fluid in duct 238 is controlled through duct 239 by pressure relief valve 237 which is constructed and operates in the same manner as in FIGURES 5 to 8. The pressure in duct 238 is conveyed to a first fluid pressure operable device 337 and to control valve 255 which is connected at 338 to operate stop valve 339. In the condition shown control valve 255 blocks duct 238 and connects duct 275 to exhaust duct 276 so that the pressure in device 337 is determined by the minimum relief pressure setting of valve 237, and stop valve 339 connects a second fluid pressure operable device 340 through a duct 341 to exhaust duct 276.

When control valve 255 is actuated, valve 339 isolates device 340 from exhaust at the same time that the pressure in duct 238 is applied through duct 275 to act on piston 229. The pressure of the fluid acting on device 337 increases from the minimum relief pressure setting to the pause pressure determined by the pressure at which piston 229 uncovers ports 296. When the latter are uncovered fluid from duct 238 flows through duct 281 to the device 340, and the pressure of the fluid acting on device 340 increases from zero to the pause pressure. As soon as the pressure acting on device 340 reaches the pause pressure, the pressures acting on both devices 337 and 340 increase together until flange 301 of the piston 229 abuts ledge 317 so that the pressure relief valve 237 is at its maximum relief pressure setting. As soon as the control valve 255 is returned to the position shown in FIGURE 9, the pressure acting on device 340 drops to zero through valve 339, and the pressure acting on device 337 decays to the minimum relief pressure setting.

The circuit of FIGURE 9 can be modified in many ways without departing from the spirit of the invention. For instance, the valves 255 and 339 need not be operated together as just described, and the circuit of FIGURE 9 may have any, or all, of the refinements taught with reference to FIGURES 1 to 8.

What we claim as our invention and desire to secure by Letters Patent of the United States is:

1. A fluid pressure circuit including a first fluid pressure operable device, a second fluid pressure operable device, a source of fluid connected to said first device, an exhaust path for said fluid, a movable member, means for biasing said movable member to restrict said exhaust path, said movable member and said biasing means constituting a pressure relief valve adapted to prevent the pressure of the fluid acting on said first device from falling below a predetermined minimum value, an axially-movable piston having a greater effective area than that of said movable member, a body defining a cylinder bore coacting with said piston, a resiliently distortable means operatively interconnecting the piston and the movable member, a first valve means adapted optionally to connect said source of fluid to act on the piston whereby the force generated by the fluid pressure on the piston will be transmitted through said resiliently distortable means to act on the movable member thereby to increase the pressure of the source of fluid above said minimum value, control means adapted to inhibit the transmission of additional force from the piston to the movable member when the pressure of the source of fluid has reached a predetermined maximum value, a second valve means operable to connect the source of fluid to the said second device, and said second valve means adapted to be operated when the pressure of the source of fluid exceeds a predetermined value intermediate said maximum and minimum values.

2. A fluid pressure circuit including a first fluid pressure operable device, a second fluid pressure operable device, a source of fluid connected to said first device, an exhaust path for said fluid, a movable member, means for biasing said movable member to restrict said exhaust path, said movable member and said biasing means constituting a pressure relief valve adapted to prevent the pressure of the fluid acting on said first device from falling below a predetermined minimum value, an axially-movable piston having a greater effective area than that of said movable member, a body defining a cylinder bore coacting with said piston, a resiliently distortable means operatively interconnecting the piston and the movable member, a first valve means adapted optionally to connect said source of fluid to act on the piston whereby the force generated by the fluid pressure on the piston will be transmitted through said resiliently distortable means to act on the movable member thereby to increase the pressure of the source of fluid above said minimum value, a resiliently distortable buffer arranged to act progressively on the piston in opposition to said force generated by the fluid pressure whereby the forces exerted on the piston by the fluid pressure and by said resiliently distortable means and by said resiliently distortable buffer and said biasing means are in equilibrium when the pressure of the source of fluid has reached a predetermined maximum value, a second valve means operable to connect the source of fluid to the said second device, and said second valve means adapted to be operated when the pressure of the source of fluid exceeds a predetermined value intermediate said maximum and minimum values.

3. A fluid pressure circiut including a first fluid pressure operable device, a second fluid pressure operable device, a source of fluid connected to said first device, an exhaust path for said fluid, a movable member, means for biasing said movable member to restrict said exhaust path, said movable member and said biasing means constituting a pressure relief valve adapted to prevent the pressure of the fluid acting on said first device from falling below a predetermined minimum value, an axially-movable piston having a greater effective area than that of said movable member, a body defining a cylinder bore coacting with said piston, a resiliently distortable means operatively interconnecting the piston and the movable member, a valve means adapted optionally to connect said source of fluid to act on the piston whereby the force generated by the fluid pressure on the piston will be transmitted through said resiliently distortable means to act on the movable member thereby to increase the pressure of the source of fluid above said minimum value, control means adapted to inhibit the transmission of additional force from the piston to the movable member when the pressure of the source of fluid has reached a predetermined maximum value, said body defining a valve port communicating with said cylinder bore, said valve port connected to the said second device, the piston arranged to close said valve port when the pressure of the fluid acting on said piston is at said minimum value, and the piston arranged to open said valve port when the pressure of the source of fluid exceeds a predetermined value intermediate said maximum and minimum values.

4. A fluid pressure circuit including a first fluid pressure operable device, a second fluid pressure operable device, a source of fluid connected to said first device, an exhaust path for said fluid, a movable member, means for biasing said movable member to restrict said exhaust path, said movable member and said biasing means constituting a pressure relief valve adapted to prevent the pressure of the fluid acting on said first device from falling below a predetermined minimum value, an axially-movable piston having a greater effective area than that of said movable member, a body defining a cylinder bore coacting with said piston, a resiliently distortable means operatively interconnecting the piston and the movable member, a valve means adapted optionally to connect said source of fluid to act on the piston whereby the force generated by the fluid pressure on the piston will be transmitted through said resiliently distortable means to act on the movable member thereby to increase the pressure of the source of fluid above said minimum value, a resiliently distortable buffer arranged to act progressively on the piston in opposition to said force generated by the fluid pressure whereby the forces exerted on the piston by the fluid pressure and by said resiliently distortable means and by said resiliently distortable buffer and said biasing means are in equilibrium when the pressure of the source of fluid has reached a predetermined maximum value, said body defining a valve port communicating with said cylinder bore, said valve port connected to the said second device, the piston arranged to close said valve port when the pressure of the fluid acting on said piston is at said minimum value, and the piston arranged to open said valve port when the pressure of the source of fluid exceeds a predetermined value intermediate said maximum and minimum values.

5. A fluid pressure circuit, according to claim 4, in which a dashpot constitutes said second fluid pressure operable device, said dashpot is adapted to store a volume of fluid under pressure when the valve port is opened by the piston, a flow restrictor, said valve means is operable between a first position in which the source of fluid is connected to act on the piston and a second position in which the source of fluid is isolated from the piston and the fluid acting on the piston is connected to said exhaust path through said flow restrictor, a non-return valve, and the dashpot is connected through said non-reutrn valve to a point in the fluid circuit intermediate the piston and the flow restrictor whereby, when the valve means is operated to the second position and the pressure of the fluid acting on the piston has dropped to a value below the pressure of the volume of fluid stored by the dashpot, the fluid stored by the dashpot will pass through the non-return valve to increase the volume of fluid that must pass through the flow restrictor thereby to decrease the rate at which the pressure acting on the piston will decay and consequently to decrease the rate at which the pressure of the source of fluid and the pressure acting on the said first fluid pressure operable device will decay to the said minimum value.

6. A fluid pressure circuit, according to claim 5, a change-speed gearing, a first friction surface, a second friction surface, a ratio-selecting member adapted optionally to engage said first surface to provide one ratio of the gearing or to engage said second surface to provide another ratio of the gearing, a mechanical spring means arranged to bias said ratio-selecting member to engage the first surface, said first device adapted to move said ratio-selecting member against the bias of the mechanical spring means to engage the second surface when said valve means is operated to its said first position, and the force generated by the first device when the fluid stored by the dashpot starts to pass through said flow restrictor is arranged to prevent the full engagement of the ratio-selecting member with the first surface under the bias of the mechanical spring means whereby the full engagement of the said one ratio will be delayed until the pressure acting on the first device has decayed to the said minimum value.

7. A fluid pressure circuit including a fluid pressure operable device, a dashpot adapted to store a volume of fluid under pressure, a source of fluid connected to said devce, an exhaust path for said fluid, a movable member, means for biasing said movable member to restrict said exhaust path, said movable member and said biasing means constituting a pressure relief valve adapted to prevent the pressure of the fluid acting on said device from falling below a predetermined minimum value, an axially-movable piston having a greater effective area than that of said movable member, a body defining a cylinder bore coacting with said piston, a resiliently distortable means operatively interconnecting the piston and the movable member, a first valve means operable to a first position in which the source of fluid is connected to act on the piston whereby the force generated by the fluid pressure on the piston will be transmitted through said resiliently distortable means to act on the movable member thereby to increase the pressure of the source of fluid above said minimum value, control means adapted to inhibit the transmission of additional force from the piston to the movable member when the pressure of the source of fluid has reached a predetermined maximum value, a second valve means operable to connect the source of fluid to the said dashpot, said second valve means adapted to be operated when the pressure of the source of fluid exceeds a predetermined value intermediate said maximum and minimum values, a flow restrictor, said first valve means operable to a second position in which the source of fluid is isolated from the piston and the fluid acting on the piston is connected to said exhaust path through said flow restrictor, a non-return valve, and the dashpot is connected through said non-return valve to a point in the fluid circuit intermediate the piston and the flow restrictor whereby, when the first valve means is operated to the second position and the pressure of the fluid acting on the piston has dropped to a value below the pressure of the volume of fluid stored by the dashpot, the fluid stored by the dashpot will pass through the non-return valve to increase the volume of fluid that must pass through the flow restrictor thereby to decrease the rate at which the pressure acting on the piston will decay and consequently to decrease the rate at which the pressure of the source of fluid and the pressure acting on the said first fluid pressure operable device will decay to the said minimum value.

8. A fluid pressure circuit, according to claim 7, a change-speed gearing, a first friction surface, a second friction surface, a ratio-selecting member adapted optionally to engage said first surface to provide one ratio of the gearing or to engage said second surface to provide another ratio of the gearing, a mechanical spring means arranged to bias said ratio-selecting member to engage the first surface, said device adapted to move said ratio-selecting member against the bias of the mechanical spring means to engage the second surface when said first valve means is operated to its said first positon, and the force generated by the device when the fluid stored by the dashpot starts to pass through said flow restrictor is arranged to prevent the full engagement of the ratio-selecting member with the first surface under the bias of the mechanical spring means whereby the full engagement of the said one ratio will be delayed until the pressure acting on the device has decayed to the said minimum value.

9. A fluid pressure circuit, according to claim 8 and in the case where the said fluid is a lubricant, including a forced lubrication circuit, and said exhaust path is connected to feed the forced lubrication circuit.

10. A fluid pressure circuit, according to claim 9, including a second pressure relief valve arranged in said forced lubrication circuit, and said second pressure relief valve is arranged to control the pressure in the forced lubrication circuit to be lower than the said minimum value.

11. A fluid pressure circuit, according to claim 8, in which the force generated by said device when the pressure of the source of fluid is at said intermediate value is arranged to be sufficient for disengaging the ratio-selecting member from said first surface against the bias of said mechanical spring means and for engaging said ratio-selecting member at least partially with said second surface.

12. A fluid pressure circuit, according to claim 8, in which the device is arranged to cause the complete engagement of the said ratio-selecting member with said second surface at a fluid pressure below the said intermediate value whereby the flow of fluid into the dashpot will not interfere with the engagement of the said another ratio of the change-speed gearing.

13. A fluid pressure circuit, according to claim 8, including a resiliently distortable member interconnecting the said device and the said ratio-selecting member whereby to cushion the engagement of the ratio-selecting member with the second surface.

14. A fluid pressure circuit including a first fluid pressure operable device, a second fluid pressure operable device, a source of fluid connected to said first device, an exhaust path for said fluid, a movable member, means for biasing said movable member to restrict said exhaust path, said movable member and said biasing means constituting a pressure relief valve adapted to prevent the pressure of the fluid acting on said first device from falling below a predetermined minimum value, an axially-movable piston having a greater effective area than that of said movable member, a body defining a cylinder bore coacting with said piston, a resiliently distortable means operatively interconnecting the piston and the movable member, a control valve adapted optionally to connect said source of fluid to act on the piston whereby the force generated by the fluid pressure on the piston will be transmitted through said resiliently distortable means to act on the movable member thereby to increase the pressure of the source of fluid above said minimum value, a resiliently distortable buffer arranged to act progressively on the piston as the latter is moved by the fluid pressure acting on it whereby progressively to check the effect of the piston on the pressure relief valve and to provide a stable maximum relief pressure, a first valve means operable to connect the source of fluid to the said second device, and said second valve means adapted to be operated by said piston when the pressure of the source of fluid exceeds a predetermined value intermediate said maximum and minimum values, said control valve is arranged optionally to disconnect the piston from the source of fluid and to connect the fluid acting on the piston to said exhaust path whereby the pressure of the source of fluid and the pressure of the fluid acting on the first device will fall to its said minimum value, and a second valve means arranged to connect the fluid acting on the second device to said exhaust path when said piston is disconnected from the source of fluid.

15. A fluid pressure circuit including a fluid pressure operable device, a change-speed gearing, a first friction surface, a second friction surface, a ratio-selecting member adapted optionally to engage said first surface to provide one ratio of the gearing or to engage said second surface to provide another ratio of the gearing, a mechanical spring means arranged to bias said ratio-selecting member to engage the first surface, said device adapted to move said ratio-selecting member against the bias of the mechanical spring means to engage the second surface, a source of fluid connected to said first device, an exhaust path for said fluid, a movable member, means for biasing said movable member to restrict said exhaust path, said movable member and said biasing means constituting a pressure relief valve adapted to prevent the pressure of the fluid acting on said device from falling below a predetermined minimum value, said minimum value sufficiently low for the bias of said mechanical spring means to cause the ratio-selecting member completely to engage the first surface, an axially-movable piston having a greater effective area than that of said movable member, a body defining a cylinder bore coacting with said piston, a resiliently distortable means operatively interconnecting the piston and the movable member, a control valve adapted optionally to connect said source of fluid to act on the piston whereby the force generated by the fluid pressure on the piston will be transmitted through said resiliently distortable means to act on the movable member thereby to increase the pressure of the source of fluid above said minimum value and thus increase the fluid pressure to cause the device to move the ratio-selecting member against said bias to engage said second surface, a resiliently distortable buffer arranged to act progressively on the piston as the latter is moved by the fluid pressure acting on it whereby progressively to check the effect of the piston on the pressure relief valve and to provide a stable maximum relief pressure so that the maximum force exerted by the device on the ratio-selecting member for engaging said second surface is limited, a dashpot adapted to store a volume of fluid under pressure, a valve means operable by the piston to connect the source of fluid to the dashpot, said valve means adapted to be operated when the pressure of the source of fluid exceeds a predetermined value intermediate said maximum and minimum values, a flow restrictor, said control valve arranged optionally to disconnect the piston from the source of fluid and to connect the fluid acting on the piston to said exhaust path through said flow restrictor whereby the pressure acting on the piston will decay quickly at least until the said valve means is closed so that the pressure acting on said device will decay rapidly to a value at which said bias will cause the ratio-selecting member partially to engage the first surface, a non-return valve operatively connecting the dashpot to a point in the fluid circuit intermediate the piston and the flow restrictor so that when the pressure acting on the piston falls below the pressure of the dashpot fluid the latter will flow through the non-return valve and will decrease the rate at which the pressure acting on the piston will decay through the flow restrictor, whereby the pressure acting on the device will decay slowly from the value at which said non-return valve opened to the said minimum value so that, as the pressure acting on the device slowly decays, said bias will progressively assert itself and will smoothly cause the complete engagement of the ratio-selecting member with said first surface.

References Cited

UNITED STATES PATENTS

| | | | |
|---|---|---|---|
| 2,807,968 | 10/1957 | Forster | 192—85 X |
| 2,935,999 | 5/1960 | Hock et al. | 192—85 X |
| 2,939,557 | 6/1960 | Dabich et al. | |
| 3,042,165 | 7/1962 | Yokel | 192—85 |
| 3,157,067 | 11/1964 | Tuck et al. | 74—754 |

DONLEY J. STOCKING, *Primary Examiner.*

DAVID J. WILLIAMOWSKY, *Examiner.*

J. R. BENEFIEL, *Assistant Examiner.*